(12) United States Patent
Taniguchi et al.

(10) Patent No.: US 10,116,847 B2
(45) Date of Patent: Oct. 30, 2018

(54) IMAGING UNIT AND IMAGING APPARATUS

(71) Applicant: Panasonic Intellectual Property Management Co., Ltd., Osaka (JP)

(72) Inventors: Takuo Taniguchi, Osaka (JP); Tomohiro Murakami, Osaka (JP); Tetsuya Ohno, Osaka (JP); Hikaru Tsuchitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/655,048

(22) Filed: Jul. 20, 2017

(65) Prior Publication Data

US 2017/0318204 A1 Nov. 2, 2017

Related U.S. Application Data

(63) Continuation of application No. 14/969,894, filed on Dec. 15, 2015, now Pat. No. 9,749,510.

(30) Foreign Application Priority Data

Dec. 25, 2014 (JP) .................. 2014-263437
Dec. 1, 2015 (JP) .................. 2015-234367

(51) Int. Cl.
*H04N 5/225* (2006.01)
*G02B 7/02* (2006.01)
(Continued)

(52) U.S. Cl.
CPC ............. *H04N 5/2254* (2013.01); *G02B 7/16* (2013.01); *H04M 1/21* (2013.01); *H04N 5/2252* (2013.01); *G02B 7/023* (2013.01)

(58) Field of Classification Search
None
See application file for complete search history.

(56) References Cited

U.S. PATENT DOCUMENTS

| 5,930,544 A | 7/1999 | Tseng |
| 6,072,139 A | 6/2000 | Nakase |

(Continued)

FOREIGN PATENT DOCUMENTS

| JP | 8-84286 | 3/1996 |
| JP | 9-015675 | 1/1997 |

(Continued)

OTHER PUBLICATIONS

International Search Report dated Mar. 31, 2015 in International (PCT) Application No. PCT/JP2014/006297.

(Continued)

*Primary Examiner* — Mark T Monk
(74) *Attorney, Agent, or Firm* — Wenderoth, Lind & Ponack, L.L.P.

(57) ABSTRACT

The imaging apparatus of the present invention includes a main body, first camera fixedly arranged on the main body, an opening-closing unit provided rotatably with respect to the main body via a first hinge unit, a second camera mounted on the opposite side of the opening-closing unit from the first hinge unit, and a second hinge unit for rotatably supporting the imaging direction of the second camera. A body surface of the second camera is uneven, and the rotation direction of the first hinge unit and the rotation direction of the second hinge unit are the same rotation direction at the time of starting shooting with the second camera.

1 Claim, 13 Drawing Sheets

(51) Int. Cl.
*G02B 7/16* (2006.01)
*H04M 1/21* (2006.01)

(56) References Cited

U.S. PATENT DOCUMENTS

| | | | |
|---|---|---|---|
| 7,053,320 B2 | 5/2006 | Kodo | |
| 7,496,378 B2 * | 2/2009 | Kawamura | H04M 1/0245 |
| | | | 455/556.1 |
| 9,491,358 B2 | 11/2016 | Tsuchida et al. | |
| 9,641,762 B2 | 5/2017 | Sakai et al. | |
| 9,749,510 B2 | 8/2017 | Taniguchi et al. | |
| 9,781,317 B2 | 10/2017 | Taniguchi | |
| 2003/0021598 A1 | 1/2003 | Higashiyama et al. | |
| 2004/0080667 A1 | 4/2004 | Jeong | |
| 2005/0006210 A1 | 1/2005 | Kodo et al. | |
| 2005/0062876 A1 | 3/2005 | Okutani et al. | |
| 2005/0219372 A1 | 10/2005 | Watanabe | |
| 2008/0316686 A1 | 12/2008 | Yamazato et al. | |
| 2012/0270598 A1 | 10/2012 | Okuda | |
| 2013/0032456 A1 | 2/2013 | Nakajima | |
| 2017/0181120 A1 | 6/2015 | Tsuchida et al. | |
| 2017/0118416 A1 | 4/2017 | Sakai et al. | |
| 2017/0134665 A1 | 5/2017 | Sakai et al. | |
| 2017/0318204 A1 | 11/2017 | Taniguchi et al. | |

FOREIGN PATENT DOCUMENTS

| | | |
|---|---|---|
| JP | 10-239773 | 9/1998 |
| JP | 2000-333059 | 11/2000 |
| JP | 2003-037765 | 2/2003 |
| JP | 2003-051872 | 2/2003 |
| JP | 2003-262913 | 9/2003 |
| JP | 2004-281275 | 10/2004 |
| JP | 2005-32450 | 2/2005 |
| JP | 2005-51455 | 2/2005 |
| JP | 2005-080117 | 3/2005 |
| JP | 2005-323336 | 11/2005 |
| JP | 2008-034997 | 2/2008 |
| JP | 2009-005255 | 1/2009 |
| JP | 2010-252186 | 11/2010 |

OTHER PUBLICATIONS

A Press Release For Sales of Camcorder (HC-W850M/V750M) Published on Jan. 9, 2014 URL:https://news.panasonic.com/jp/press/data/2014/01/jn140109-1/jn140109-1.html, Manufacturer: Panasonic, see concise explanation.

* cited by examiner

IMAGING UNIT AND IMAGING APPARATUS

BACKGROUND

1. Technical Field

The present disclosure relates to an imaging unit and an imaging apparatus equipped with the imaging unit.

2. Description of the Related Art

PTL1 discloses a mobile communication device equipped with a rotatable camera. Further various operations are demanded in an electronic apparatus equipped with a rotatable camera, such as this mobile communication device.

CITATION LIST

Patent Literature

PTL1 Unexamined Japanese Patent Application No. 2003-51872

SUMMARY

The present disclosure offers an imaging unit including a mechanism for tilting a lens forward and backward, and an imaging apparatus equipped with the imaging unit.

To solve the above disadvantage, the imaging apparatus of the present disclosure includes a main body, first camera fixedly arranged on the main body, an opening-closing unit provided rotatably with respect to the main body via a first hinge unit, a second camera mounted on the opposite side of the opening-closing unit from the first hinge unit, and a second hinge unit for rotatably supporting the imaging direction of the second camera. A body surface of the second camera is uneven, and the rotation direction of the first hinge unit and the rotation direction of the second hinge unit are the same rotation direction at the time of starting shooting with the second camera.

The present disclosure can offer a small imaging unit with good operability that can be rotated in two axial directions, and an imaging apparatus equipped with the imaging unit.

DETAILED DESCRIPTION OF THE PREFERRED EMBODIMENT

An exemplary embodiment is detailed below with reference to drawings. However, description in details more than necessary may be omitted. For example, detailed description of well-known subjects and duplicate description of practically the same configuration may be omitted. This is to avoid unnecessary redundancy in the description to facilitate understanding of a person having ordinary skill in the art.

Inventors intend to provide attached drawings and the following description to enable a person having ordinary skill in the art fully understand the present disclosure. It is apparent that the description therefore does not limit in anyway the subject matters in the scope of claims.

Exemplary Embodiment

1. Outline of Digital Video Camera

Figure 1:
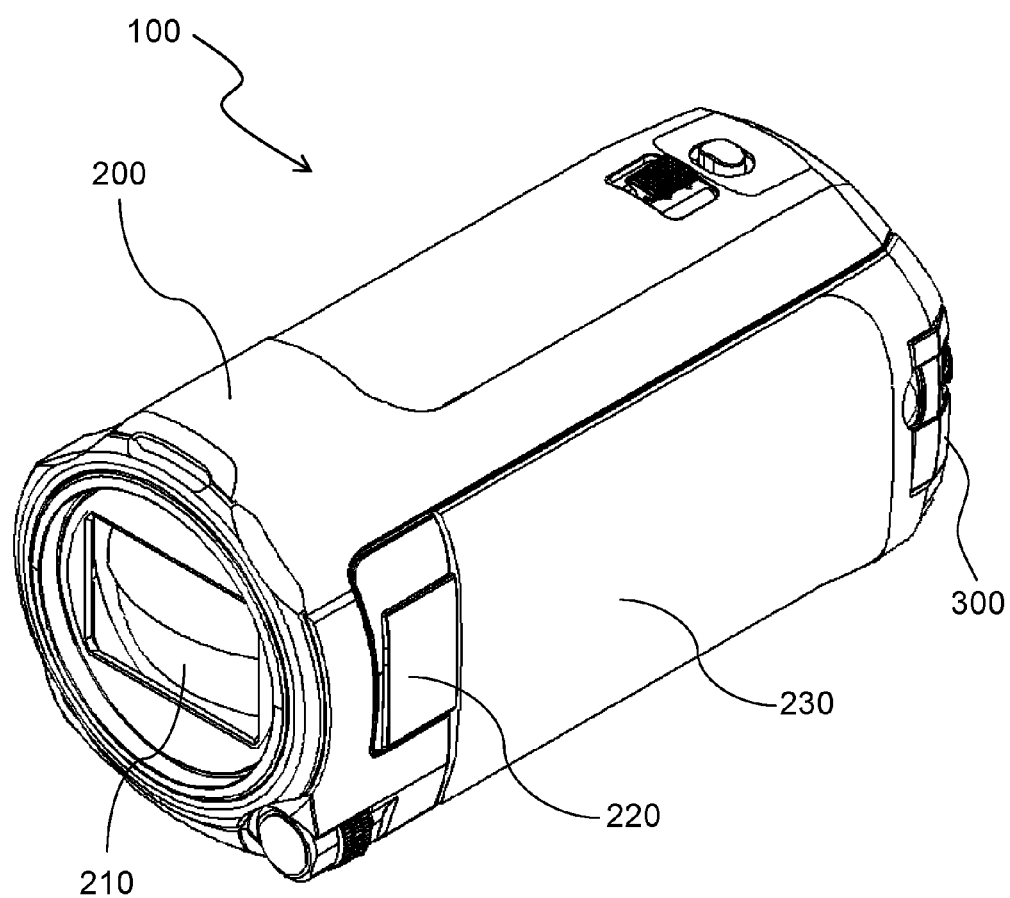
FIG. 1 is a perspective view of an appearance of a digital video camera in accordance with an exemplary embodiment.

FIG. 1 is an appearance perspective view of digital video camera 100 in the exemplary embodiment. Digital video camera 100 is an example of an imaging apparatus. As shown in FIG. 1, digital video camera 100 includes camera body 200, main camera 210 built in camera body 200, and openable unit 230 openably coupled to camera body 200 via hinge unit 220.

Openable unit 230 is coupled to camera body 200 via hinge unit 220, and is openably disposed on camera body 200, centering around hinge unit 220. Sub-camera 300 is provided at one end of openable unit 230 via a rotatable shaft mechanism. Sub-camera 300 is rotatable in forward and backward directions. In other words, digital video camera 100 includes main camera 210 and sub-camera 300. Sub-camera 300 rotates relative to openable unit 230 to change the shooting direction. Openable unit 230 can open, close, and rotate relative to camera body 200 via hinge unit 220. Accordingly, sub-camera 300 can change its shooting direction in various ways. Camera body 200 is an example of the imaging apparatus body. Sub-camera 300 is an example of the imaging unit.

Figure 2:
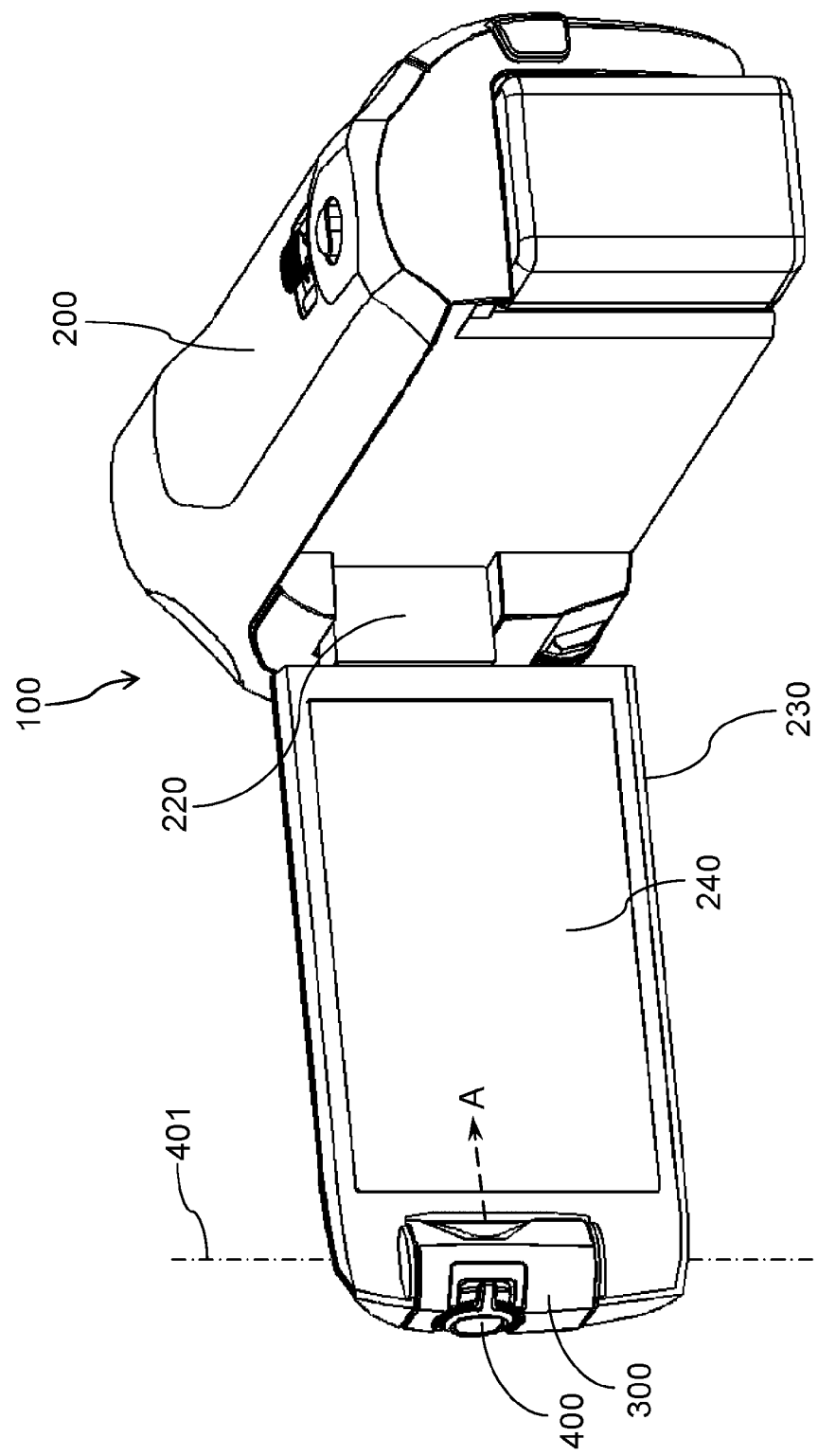
FIG. 2 is a perspective view of the digital video camera in a state an openable unit is opened (non-use state).
Figure 3:
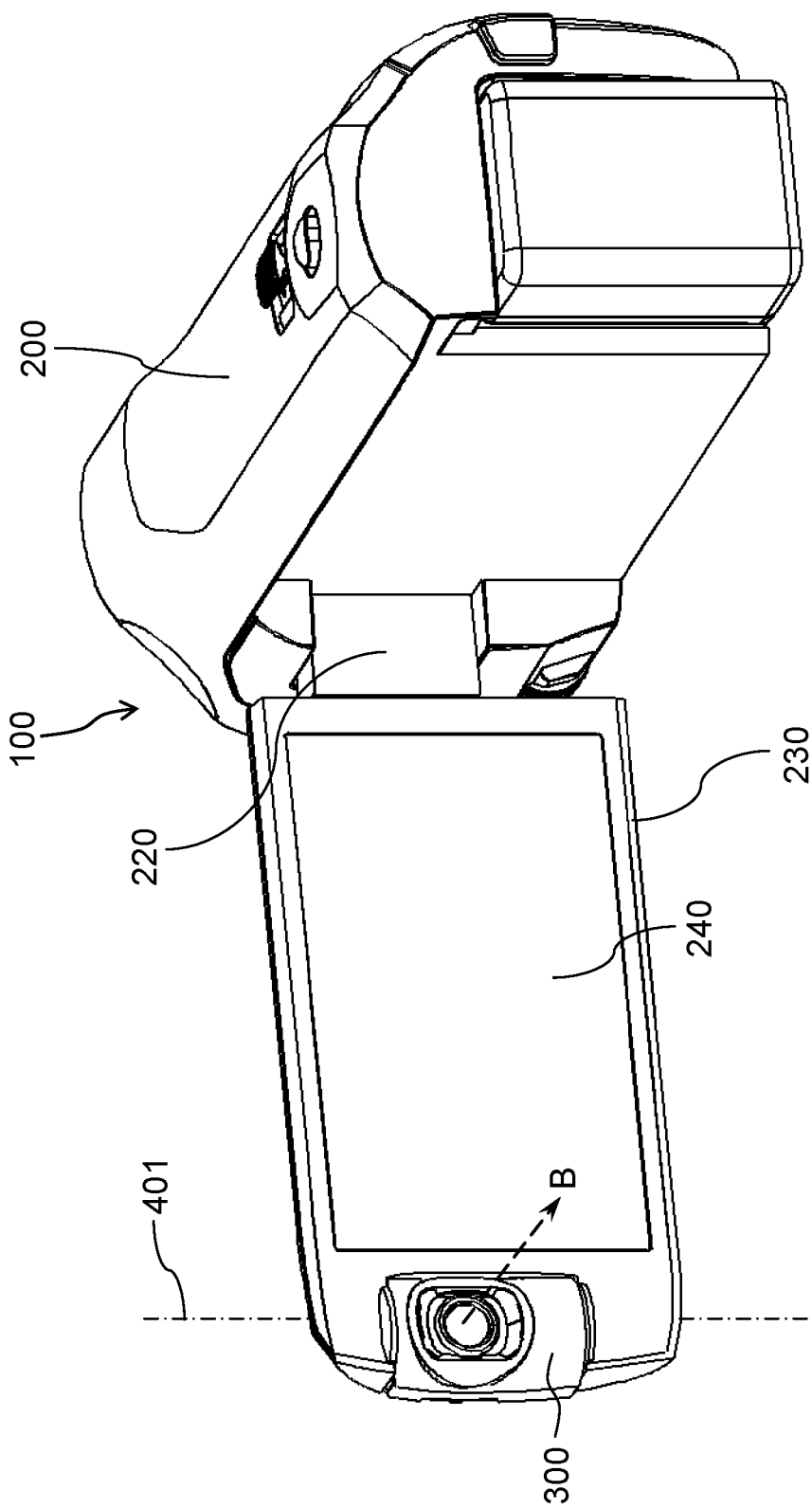
FIG. 3 is a perspective view of the digital video camera in the state the openable unit is opened (selfie state).
Figure 4:
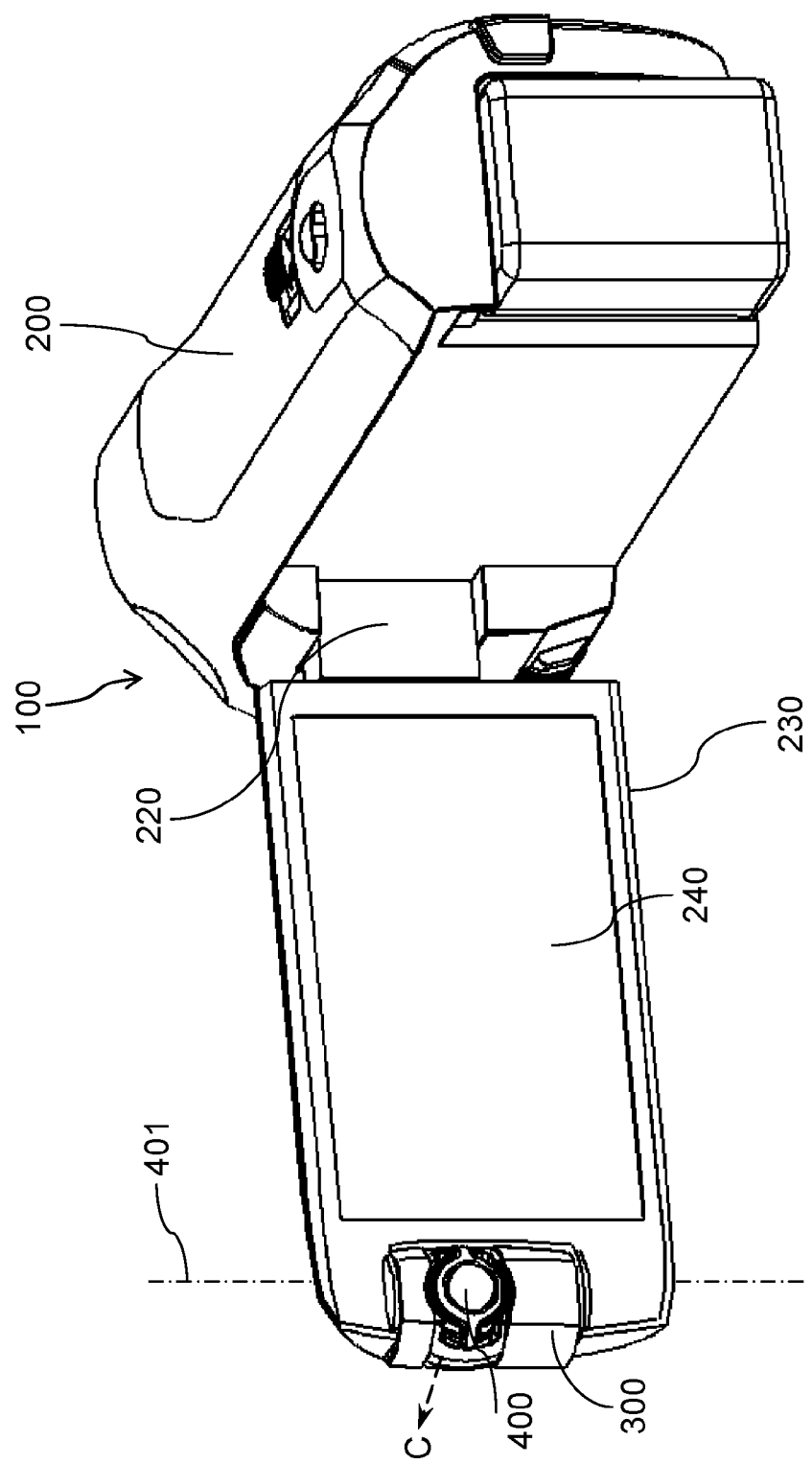
FIG. 4 is a perspective view of the digital video camera in the state the openable unit is opened (confronting shooting state).

FIGS. 2, 3, and 4 are perspective views of digital video camera 100 in FIG. 1 in a state openable unit 230 is opened. FIG. 2 shows the state that sub-camera 300 is not used (mode 1). FIGS. 3 and 4 show the selfie state (mode 2) and confronting shooting state (mode 3) of sub-camera 300, respectively.

As shown in FIGS. 2, 3, and 4, sub-camera 300 is installed in openable unit 230 via a rotatable mechanism that can be rotated about first axis 401 in forward and backward directions. Sub-camera 300 can be rotated clockwise from the state shown in FIG. 2 to the state in FIG. 3, and then from the state in FIG. 3 to the state in FIG. 4 to change the shooting direction. Sub-camera 300 can also be rotated counterclockwise from the state in FIG. 4 to the state in FIG. 3, and then from the state in FIG. 3 to the state in FIG. 2 to change the shooting direction.

As shown in FIG. 2, openable unit 230 includes liquid crystal monitor unit 240. Liquid crystal monitor unit 240 is disposed between sub-camera 300 and camera body 200. Openable unit 230 can be kept opened relative to digital video camera 100 via hinge unit 220, as shown in FIG. 2. In FIG. 2, an imaging surface (lens side) of sub-camera 300 faces inward of openable unit 230 (a direction of arrow A in FIG. 2), which is the non-use state (mode 1).

Next, as shown in FIG. 3, a photographer rotates sub-camera 300 from the non-use state in FIG. 2 to a state (selfie state) that an imaging surface of sub-camera 300 faces the photographer (a direction of arrow B in FIG. 3). This enables the photographer to shoot himself/herself using sub-camera 300. In addition, liquid crystal monitor unit 240 can overlay an image captured by sub-camera 300 on an image captured by main camera 210 for display. The photographer can shoot while confirming how himself/herself is captured by looking at a through image displayed on liquid crystal monitor unit 240.

Next, as shown in FIG. 4, the photographer rotates sub-camera 300 from the selfie state in FIG. 3 to a state that the imaging surface of sub-camera 300 faces the same direction (a direction of arrow C in FIG. 4) as main camera 210 (confronting shooting state). The confronting shooting state, in which the imaging surface of sub-camera 300 faces the same direction as main camera 210, does not only mean the case when the imaging surface of sub-camera 300 and the imaging surface of main camera 210 face completely the same direction. It means that sub-camera 300 captures an image in a direction the photographer is facing. The imaging surface of sub-camera 300 and the imaging surface of main camera 210 do not need to face completely the same direction.

This enables the photographer to capture an image at a distance with main camera 210, and capture an image nearby with sub-camera 300, allowing various ways of shooting. In this case, liquid crystal monitor unit 240 can overlay an image captured by sub-camera 300 and an image captured by main camera 210 for display.

Although not illustrated in the drawing, hinge unit 220 includes a shaft for opening and closing that is coupled to camera body 200 and a rotating shaft disposed orthogonal to this shaft for opening and closing. These shafts enable openable unit 230 to open and rotate relative to camera body 200.

Sub-camera 300 changes its shooting direction in various ways by rotating openable unit 230 relative to camera body 200 and rotating sub-camera 300 clockwise or counterclockwise relative to openable unit 230. For example, in the selfie mode shown in FIG. 3, sub-camera 300 can capture downward or upward from the shooting direction shown in FIG. 3 by rotating openable unit 230.

As shown in FIG. 2 and FIG. 4, sub-camera 300 also includes lens tilt mechanism 400 to change the shooting direction upward or downward. Sub-camera 300 can thus also change the shooting direction without rotating openable unit 230, i.e., in the state the direction of liquid crystal monitor unit 240 is fixed. Lens tilt mechanism 400 is described later.

2. Block Circuit Configuration of Digital Video Camera

Figure 5:
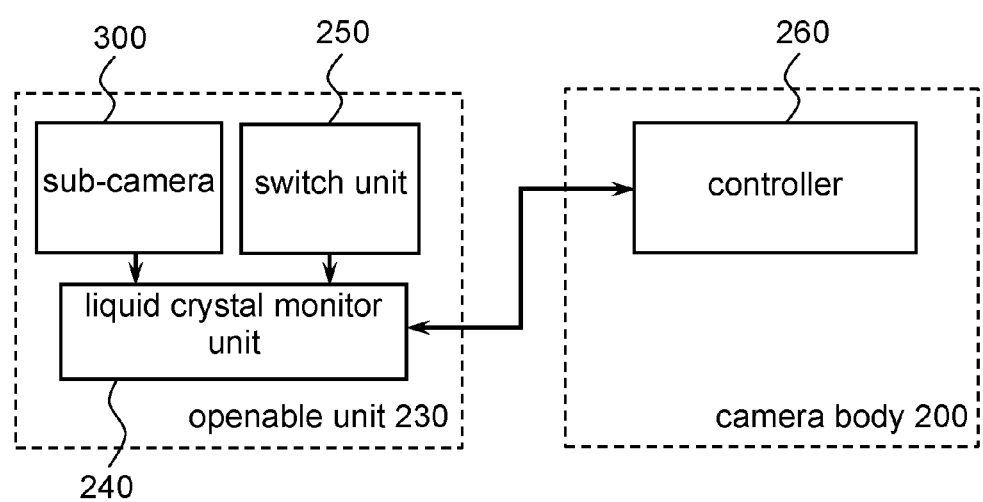
FIG. 5 is a block diagram of an electrical configuration of the digital video camera.

FIG. 5 is a block diagram illustrating an electrical configuration of digital video camera 100. As shown in FIG. 5, openable unit 230 of digital video camera 100 includes liquid crystal monitor unit 240, sub-camera 300, and switch unit 250 for detecting a rotating position of sub-camera 300. Camera body 200 includes controller 260 that receives information on the rotating position of sub-camera 300 sent from switch unit 250. Information on the rotating position of sub-camera 300 sent from switch unit 250 and image signals from an imaging element of sub-camera 300 are sent to controller 260 of camera body 200 via liquid crystal monitor unit 240. Although not illustrated, camera body 200 includes an optical system of lens group, an imaging element such as COMS image sensor, image processor, memory card slot, and control panel such as a shooting button, in addition to controller 260.

Controller 260 is a control means for controlling the entire digital video camera 100, and is typically a microcomputer. Controller 260 may be configured only by hardware, or by a combination of hardware and software. Controller 260 outputs to liquid crystal monitor unit 240 images captured by main camera 210 and sub-camera 300, and image signals for displaying a range of menu screens for various settings of digital video camera 100.

3. Configuration of Sub-Camera

Figure 6:
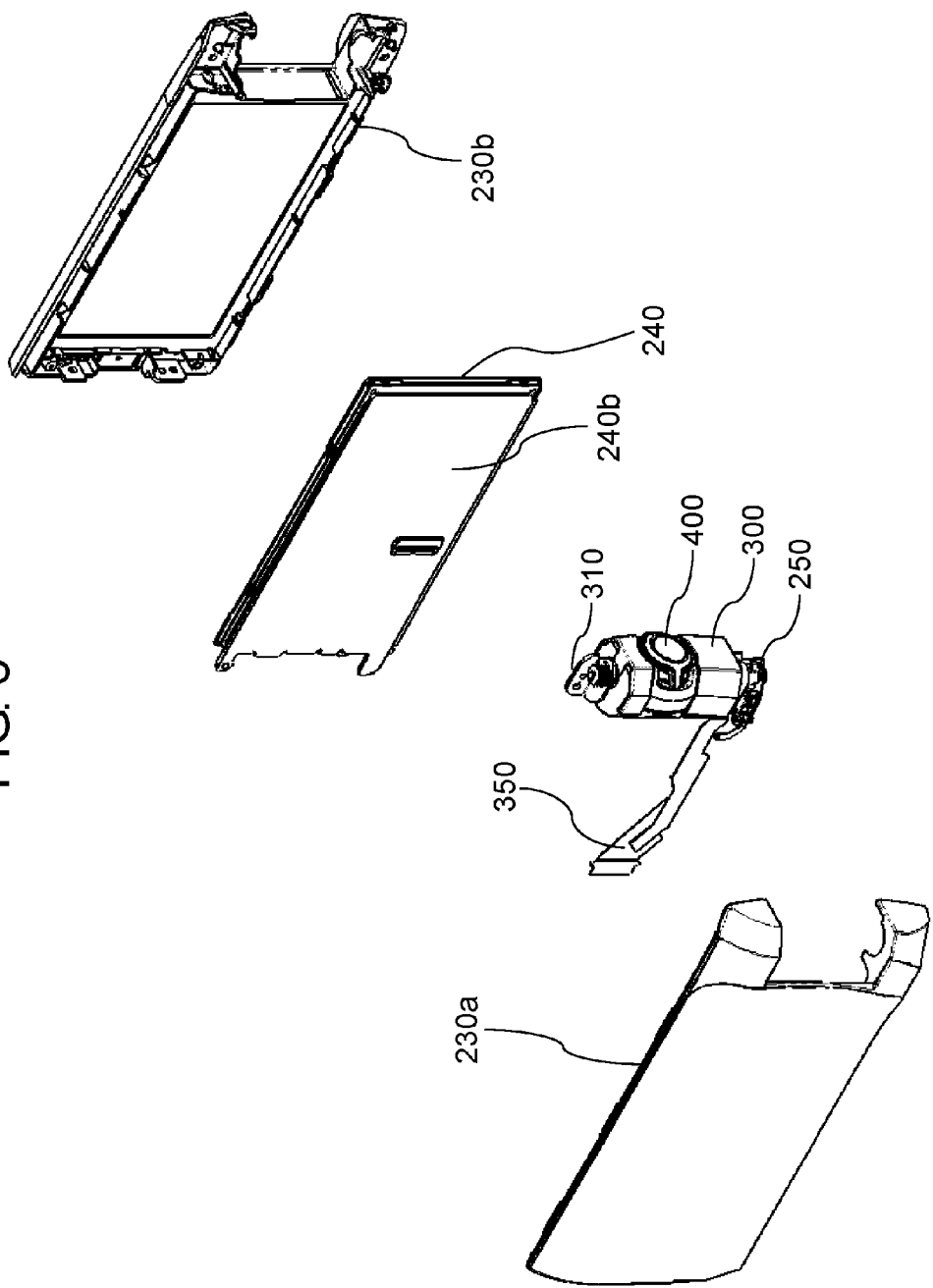
FIG. 6 is an exploded perspective view of the openable unit of the digital video camera.

Next, the configuration of sub-camera 300 is described. FIG. 6 is an exploded perspective view of openable unit 230. As shown in FIG. 6, openable unit 230 includes liquid crystal monitor unit 240, upper case 230a, lower case 230b, sub-camera 300, sub-camera hinge unit 310, and switch unit 250 having flexible printed wiring board 350.

Liquid crystal monitor unit 240 includes electronic control board 240b on the side of upper case 230a that is the back of a display. An electrical circuit for controlling liquid crystal monitor unit 240, a connector to which flexible printed wiring board 350 for taking out the electric signal from sub-camera 300 is connected, and a connector for electrically connecting to controller 260 of camera body 200 are disposed on this electronic control board 240b. Electronic control board 240b is electrically connected to controller 260 of camera body 200 to send and receive image signals and control signals to and from controller 260.

Upper case 230a and lower case 230b are integrally coupled to form a casing of openable unit 230. Upper case 230a and lower case 230b house liquid crystal monitor unit 240 when they are integrally coupled. Sub-camera 300 is assembled with upper case 230a and lower case 230b via sub-camera hinge unit 310 and switch unit 250. Sub-camera hinge unit 310 configures a rotatable shaft mechanism to hold sub-camera such that it can be rotated about first axis 401 in forward and backward directions. Sub-camera 300 is also electrically connected to electronic control board 240b disposed on liquid crystal monitor unit 240 via flexible printed wiring board 350. This enables to send electric signals corresponding to the rotating direction (shooting direction) of sub-camera 300 to controller 260 according to switchover of the rotating position of sub-camera 300.

Figure 7A:
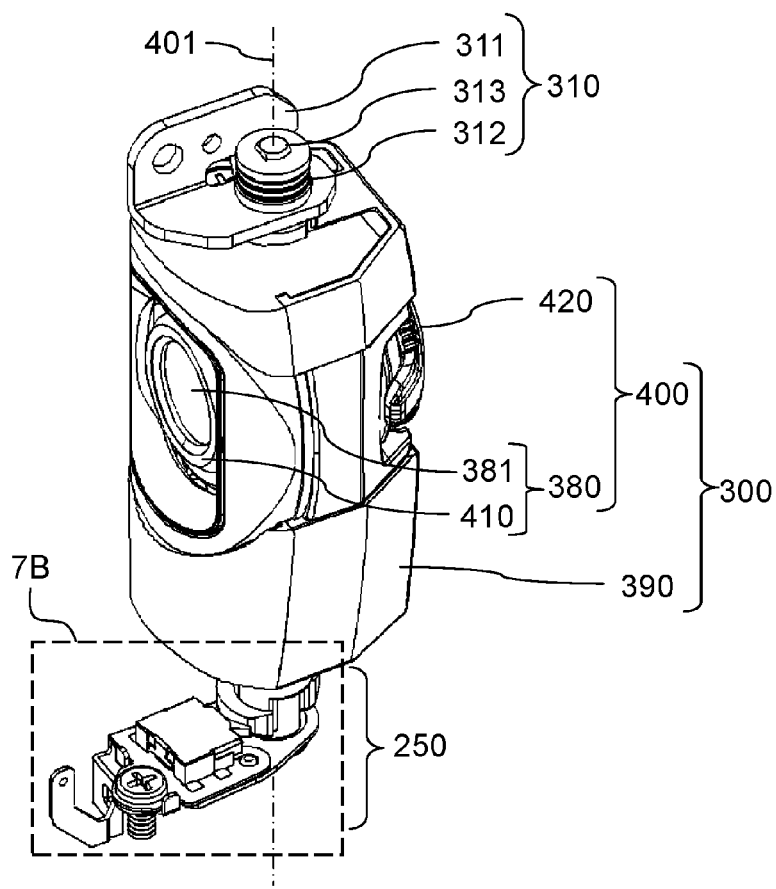
FIG. 7A is a perspective view of a sub-camera and a switch unit.
Figure 7B:
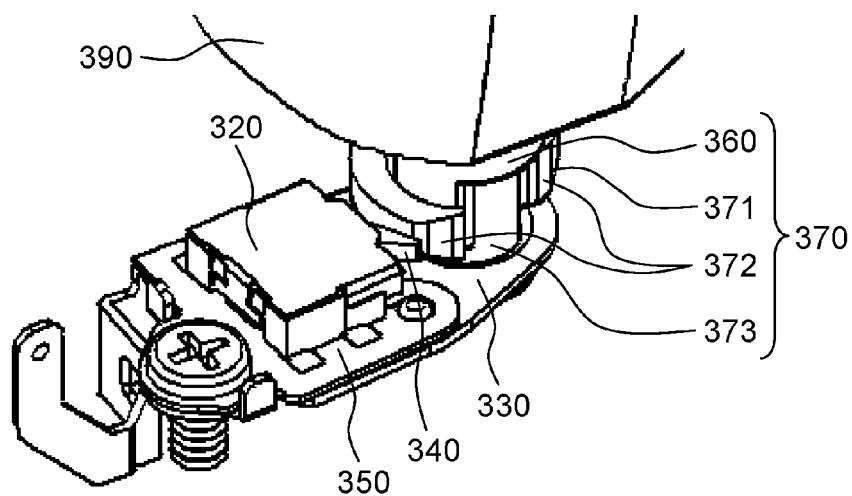
FIG. 7B is a magnified perspective view of the switch unit shown in FIG. 7A (Part 7B in FIG. 7A).

FIG. 7A is a perspective view of sub-camera 300, which is an imaging unit. FIG. 7B is a magnified perspective view of switch unit 250 of sub-camera 300. As shown in FIG. 7A, sub-camera 300 includes cylindrical housing 390 and lens tilt mechanism 400. Sub-camera hinge unit 310 and switch unit 250 rotatably support sub-camera 300 around first axis 401 relative to openable unit 230.

Sub-camera hinge unit 310 is provided on an upper end of sub-camera 300, and includes fitting 311, rotating end 312, and rotating shaft 313. Fitting 311 made of a metal sheet is fixed onto upper case 230a and lower case 230b of openable unit 230 typically with screw. Fitting 311 has a screw hole to attach sub-camera hinge unit 310 to openable unit 230 typically with screw. Rotating end 312 restricts a rotation range when sub-camera 300 rotates about rotating shaft 313. Rotating shaft 313 is the center of rotation of sub-camera 300 rotatably held relative to openable unit 230, and configures one end of first axis 401. Sub-camera hinge unit 310 is configured to restrict the rotation range of sub-camera 300 to 270 degrees. More specifically, in sub-camera hinge unit 310, when sub-camera 300 is rotated about rotating shaft 313 (first axis 401) clockwise or counterclockwise, rotating end 312 contacts a metal sheet of fitting 311 to restrict the rotation exceeding the rotation range.

Lens tilt mechanism 400 includes camera unit 380 and operating member 420, as shown in FIG. 7A. Camera unit 380 is disposed in the middle of housing 390, and includes lens holder 410, a lens group of optical system (e.g., lens 381), and an imaging element, such as CMOS image sensor. Camera unit 380 is electrically connected to flexible printed wiring board 350. Image signals captured by camera unit 380 are sent to controller 260 in camera body 200 via flexible printed wiring board 350.

Switch unit 250 detects the rotating position of sub-camera 300, and is configured to send electric signals corresponding to each of the shooting states of sub-camera to controller 260 via flexible printed wiring board 350. The shooting states include the non-use state (mode 1) in the direction of arrow A in FIG. 2, the selfie state (mode 2) in the direction of arrow B in FIG. 3, and the confronting shooting state (mode 3) in the direction of arrow C in FIG. 4.

As shown in FIG. 7B, switch unit 250 is disposed on the lower end of sub-camera 300. Switch unit 250 includes switch body 320, flexible printed wiring board 350, rotating piece 370, and fixing plate 330 made of a metal sheet holding these components.

Switch body 320 has a function as a holder for holding switch lever 340, is electrically connected to flexible printed wiring board 350, and is fixed onto fixing plate 330. Switch lever 340 is configured to indicate the three modes when switch lever 340 tilts from a center reference position to a right or left position when the center is set as the reference position. Switch body 320 includes a biasing means inside to urge switch lever 340. The biasing means urges switch lever 340 to self-recover to the reference position even when switch lever 340 displaces from the center reference position to a tilt position to the left or right. Therefore, switch lever 340 self-recovers to the center reference position by the biasing force of the biasing means when switch lever 340 is released from a state tilted to the left or right relative to switch body 320.

Rotating piece 370 is disposed on fixing plate 330 in a rotatably supported state, and rotates in line with the rotation of sub-camera 300. More specifically, sub-camera 300 is rotatably supported by fitting 311 on the side of sub-camera hinge unit 310, and rotatably supported by fixing plate 330 on the side of switch unit 250. Rotating cam 371 of rotating piece 370 includes rotating cam groove 373, which is a notch, and slope 372 gradually inclined from an outer peripheral face of rotating cam 371 to rotating cam groove 373. Rotating cam 371 has a cam structure (rotor) configured around first axis 401, which is the rotating axis of sub-camera 300, and has a portion thicker than main shaft 360 of rotating piece 370 and rotating cam groove 373 created by partially notching the thick portion. Slope 372 with a specified inclination is formed on a portion connecting (boundary portion) the portion thicker than main shaft 360 and rotating cam groove 373.

The reference position of switch lever 340 does not need to be limited to the center. The reference position may be a position tilted from the center position to either left or right, and the three modes may be indicated by this position, the center position, and a position opposite to the reference position. It is apparent that switch lever 340 is not limited to a structure of indicating the three modes. It may be configured to indicate four or five modes. Switch lever 340 is thus configured to at least indicate three modes, i.e., first mode, second, mode, and third mode.

Switch lever 340 changes its detection state based on a tilt angle in a direction tilted relative to switch body 320. As sub-camera 300 rotates about the rotating axis, slopes 372 formed on both ends of rotating cam groove 373 of rotating cam 371 rotate while making contact with switch lever 340. Slope 372 is provided at a predetermined tilt angle so that switch lever 340 can detect transition between mode 1 and mode 2, and transition between mode 2 and mode 3 in line with the rotation of rotating cam 371. If the imaging surface of sub-camera 300 (the side of lens 381 of camera unit 380) is configured to face the direction of photographer when switch lever 340 comes to the position facing rotating cam groove 373, the position of rotating cam groove 373 is preferably designed to avoid capturing a part of camera body 200 (rear part) in the shooting range of sub-camera 300.

By setting the height of rotating cam 37 in the rotating direction higher than that of switch lever 340, switch lever 340 reliably contacts rotating cam 371.

4. Operation of the Detection Switch in Line with the Rotation of Sub-Camera)

Figure 8:
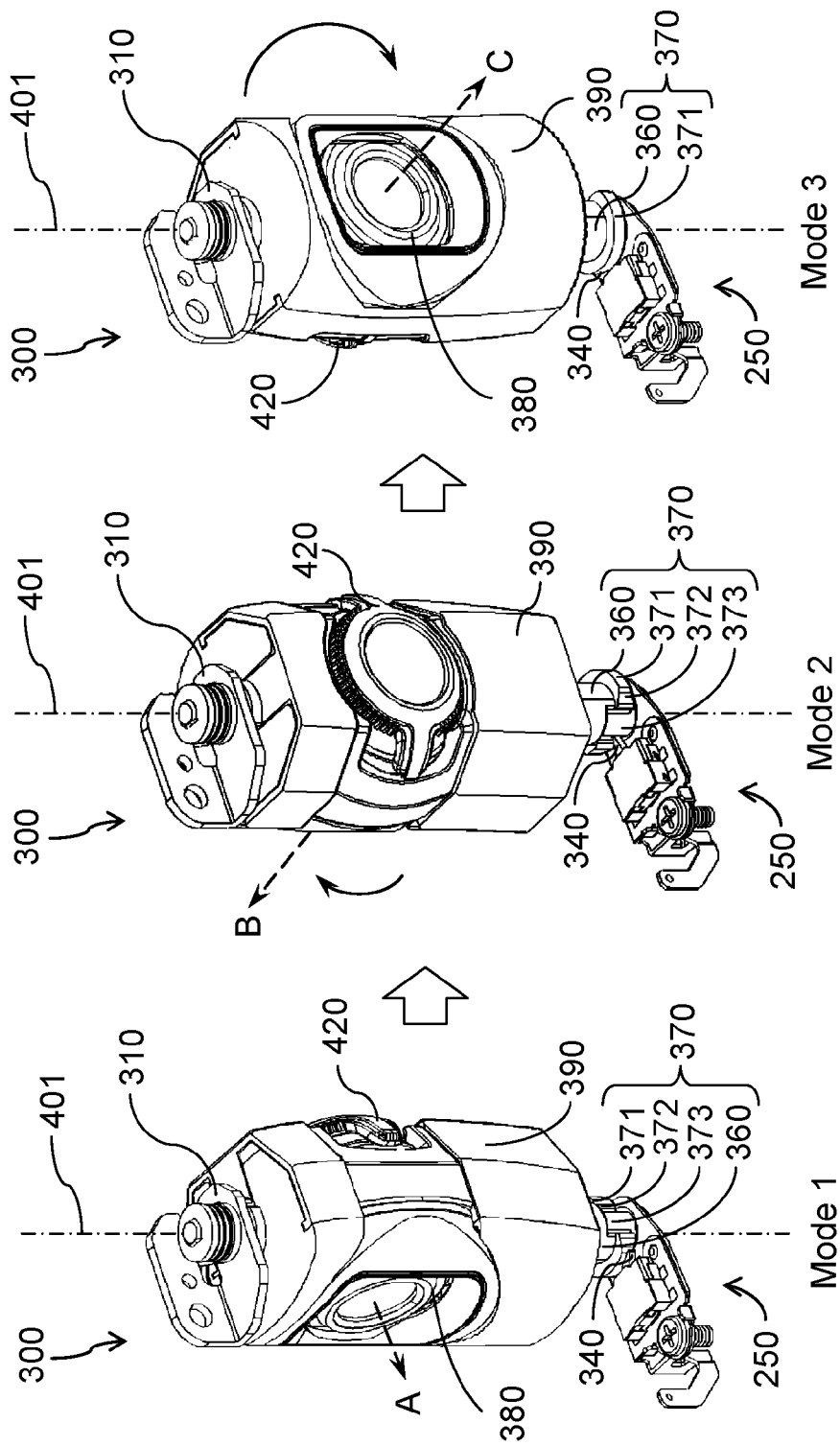
FIG. 8 illustrates transition of the switch unit in line with the rotation of the sub-camera.

FIG. 8 illustrates transition of switch unit 250 in line with the rotation of sub-camera 300.

Mode 1 in FIG. 8 shows the non-use state of sub-camera 300. As shown in FIG. 2, the non-use state (mode 1) is the state that the imaging surface of sub-camera 300 faces inward of openable unit 230 (a direction of arrow A in FIG. 8 and FIG. 2). Here, as shown in mode 1 in FIG. 8, switch lever 340 is tilted and biased in one direction relative to switch body 320 by making contact with rotating cam 371 of rotating piece 370. Switch body 320 sends a signal indicating that sub-camera 300 is in the non-use state (mode 1) to controller 260 in camera body 200 via flexible printed wiring board 350.

Mode 2 in FIG. 8 shows the state that sub-camera 300 is rotated from the non-use state to the selfie state. The selfie state (mode 2) is the state that sub-camera 300 is rotated for a predetermined angle from mode 1 in FIG. 8 and the imaging surface of sub-camera 300 faces a direction of photographer (a direction of arrow B in FIG. 8 and FIG. 3), as shown in FIG. 3. More specifically, when sub-camera 300 is in the selfie state, a positional relationship is such that rotating cam groove 373 faces switch lever 340, as shown in mode 2 in FIG. 8. Here, switch lever 340 is released from the state urged in one direction by rotating cam 371 and self-recovers to the center reference position. Switch body 320 sends a signal indicating that sub-camera 300 is in the selfie state to controller 260 in camera body 200 via flexible printed wiring board 350.

Mode 3 in FIG. 8 is the state that sub-camera 300 rotates from the selfie state to the confronting shooting state. The confronting shooting state (mode 3) is the state that the imaging surface of sub-camera 300 is further rotated from mode 2 in FIG. 8 to face substantially the same direction as main camera 210 (a direction of arrow C in FIG. 8 and FIG. 4). Here, as shown in mode 3 in FIG. 8, switch lever 340 contacts slope 372 formed on rotating cam 371 of rotating piece 370, and is urged to tilt in a direction different from mode 1 in FIG. 8 by being pushed further by rotating cam 371. Here, switch body 320 sends a signal indicating that sub-camera 300 is in the confronting shooting state to controller 260 of camera body 200 via flexible printed wiring board 350.

As described above, digital video camera 100 can detect whether the rotating position of sub-camera 300 is in the non-use state (mode 1 in FIG. 2 and FIG. 8), the selfie state (mode 2 in FIG. 3 and FIG. 8), or the confronting shooting state (mode 3 in FIG. 4 and FIG. 8) by using switch unit 250.

As described above, switch unit 250 includes switch body 320 having switch lever 340 that is a lever unit configured to self-recover to the reference position, and rotating piece 370 with which switch lever 340 makes contact. Rotating piece 370 has rotating cam 371 with rotating cam groove 373 that is a notch on a part of rotating cam 371. As rotating piece 370 rotates about the axis in one direction, rotating piece 370 transits to mode 1 in which switch lever 340 does not face rotating cam groove 373, mode 2 in which switch lever 340 faces rotating cam groove 373 in the reference position, and mode 3 in which switch lever 340 does not face rotating cam groove 373. Switch body 320, which is a detector, detects whether rotating piece 370 is in mode 1, mode 2, or mode 3. Controller 260 then determines the shooting direction of sub-camera 300 based on a signal from switch body 320.

Accordingly, in switch unit 250, the direction of switch lever 340 changes according to the shooting direction of sub-camera 300: a direction of arrow A in FIG. 2, a direction of arrow B in FIG. 3, or a direction of arrow C in FIG. 4. Switch body 320, which is the detector in switch unit 250, can send a signal corresponding to the direction of switch lever 340 to controller 260.

Figure 9:
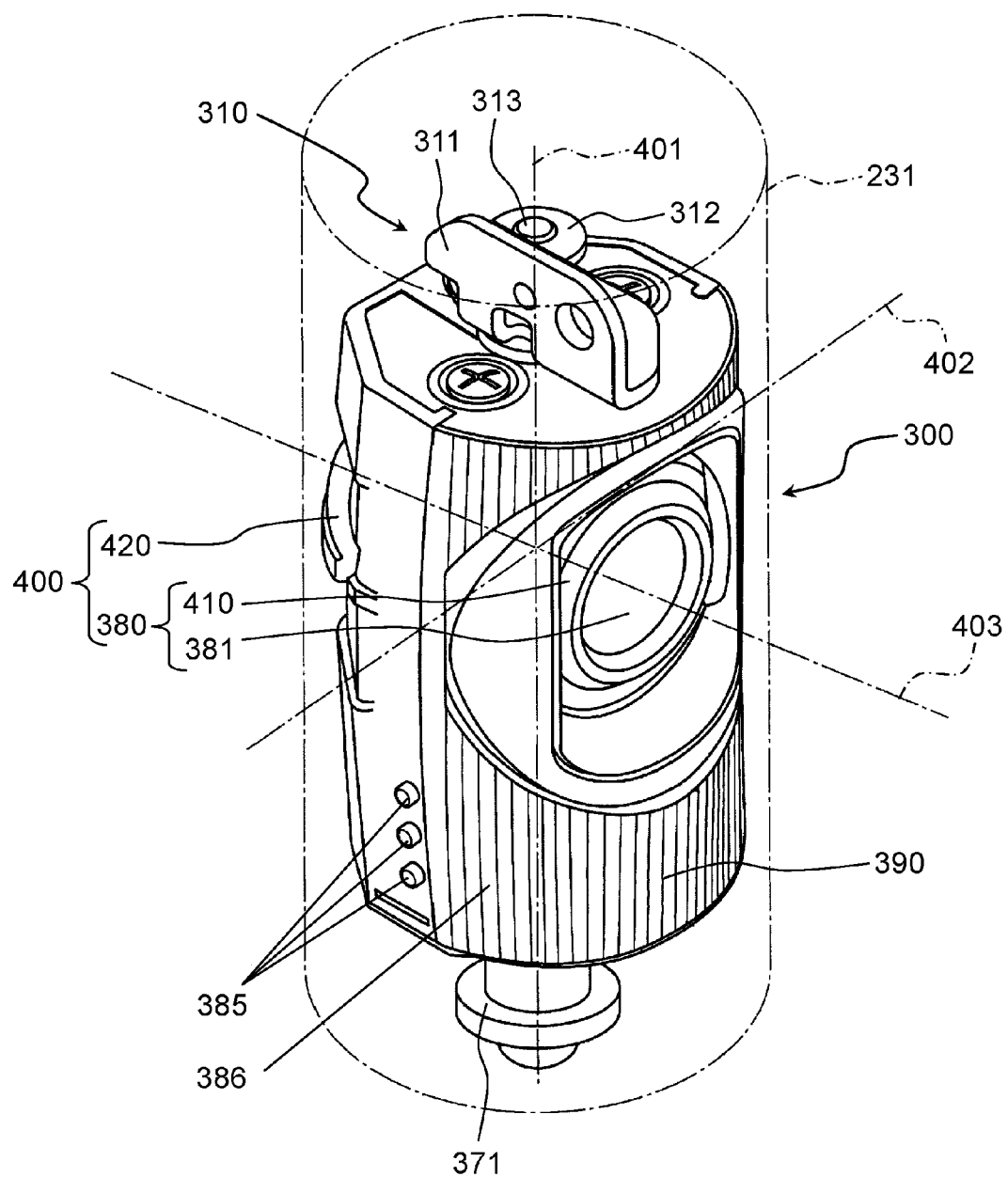
FIG. 9 is a perspective view of the sub-camera.
Figure 10:
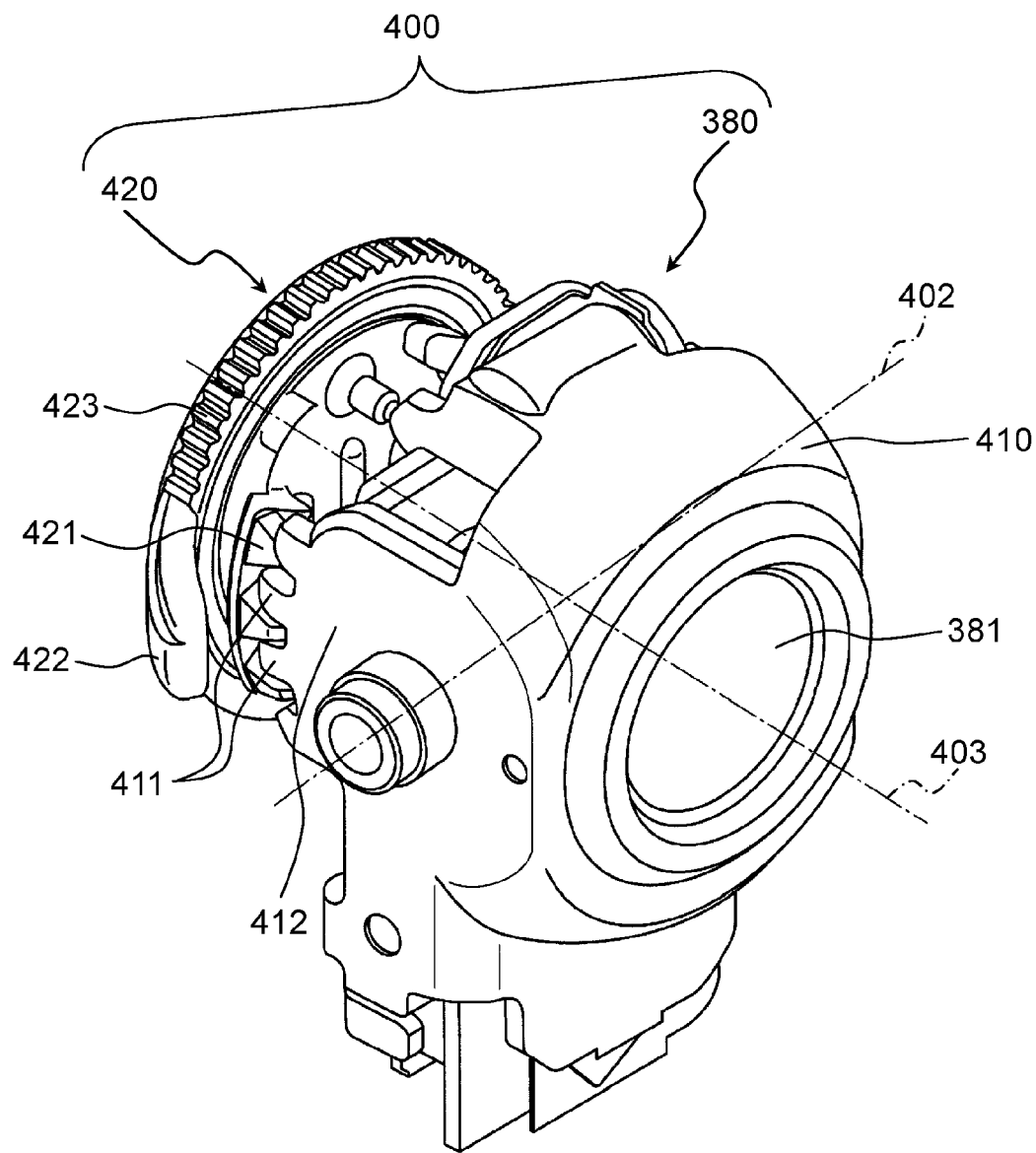
FIG. 10 is a perspective view of a camera unit of the sub-camera.

Next is described lens tilt mechanism 400 for changing the shooting direction of camera unit 380 with reference to FIGS. 9 to 13. As shown in FIG. 9, sub-camera 300 can rotate about first axis 401 in forward and backward directions in the state lens tilt mechanism 400 for tilting lens 381 forward and backward is housed in housing 390. Lens tilt mechanism 400, as shown in FIG. 9 and FIG. 10, includes camera unit 380 and operating member 420. Camera unit 380 includes lens 381 and lens holder 410 housing lens 381. In the exemplary embodiment, as shown in FIG. 9, first axis 401, second axis 402, and third axis 403 are orthogonal to each other. Camera unit 380 is rotatable about second axis 402 in forward and backward directions, and operating member 420 is rotatable about third axis 403 in forward and backward directions.

Lens holder 410 holds the optical system, such as lens 381, on its surface, and has first gear 411 extending around second axis 402. Lens holder 410 is supported by housing 390 such that lens holder 410 is rotatable about second axis 402 in forward and backward directions. First gear 411 is disposed on a rim of a plane (side wall 412) with second axis 402 of lens holder 410 as a normal, on the side of operating member 420. First gear 411 is configured with four gear teeth in FIG. 10. However, the structure is not limited to four gear teeth. Any structure with at least gear teeth on the back side of lens holder 410 is acceptable. In the exemplary embodiment, lens holder 410 is rotatable about second axis 402 in a range of 22 degrees upward and 22 degrees downward relative to the horizontal direction.

Operating member 420 is disposed on the back side of lens holder 410, and supported by housing 390 such that operating member is rotatable about third axis 403 in forward and backward directions. Operating member 420 is a disk member, and second gear 421 that engages with first gear 411 is disposed upright on the side of lens holder 410 around third axis 403. When operating member 420 rotates about third axis 403, second gear 421 engages with first gear 411 to rotate first gear 411 about second axis 402. Lens holder 410 (camera unit 380) then rotates about second axis 402. Second gear 421 is configured with three gear teeth in FIG. 10 but not limited to this structure. Operating member 420 includes operating knob 422 and gear 423.

Operating knob 422 is provided near second gear 421 and is bent and extended toward lens holder 410. Gear 423 for antislipping is provided at a rim of the disk member of operating member 420. The photographer can easily rotate operating member 420 by operating operating knob 422 and gear 423 for antislipping typically with fingers. Since operating knob 422 is bent and extended toward lens holder 410, operating knob 422 does not protrude outside of cylindrical space 231 even if lens holder 410 is rotated about second axis 402 by operating member 420. Sub-camera 300 can thus smoothly rotate about first axis 401 in cylindrical space 231. Operating knob 422 is formed extending along the outer peripheral face of cylindrical space 231 so that operating knob 422 can be operated relative to camera unit 380 regardless of the rotating position of sub-camera 300 rotating about first axis 401. In other words, operating knob 422 is formed in a circumferential direction of first axis 401. In addition, as shown in FIG. 9, three protrusions 385 and splined surface 386 are formed on sub-camera 300 for antislipping. Therefore, the photographer can easily rotate sub-camera 300 about first axis 401 by operating three protrusions 385 and splined surface 386 for antislipping typically with fingers.

First axis 401, second axis 402, and third axis 403 do not need to be strictly orthogonal to each other. As long as the plane with first axis 401 as a normal, the plane with second axis 402 as a normal, and the plane with third axis 403 as a normal cross each other, any structure is acceptable. As an example, these three planes perpendicularly cross each other in the exemplary embodiment.

Figure 11:
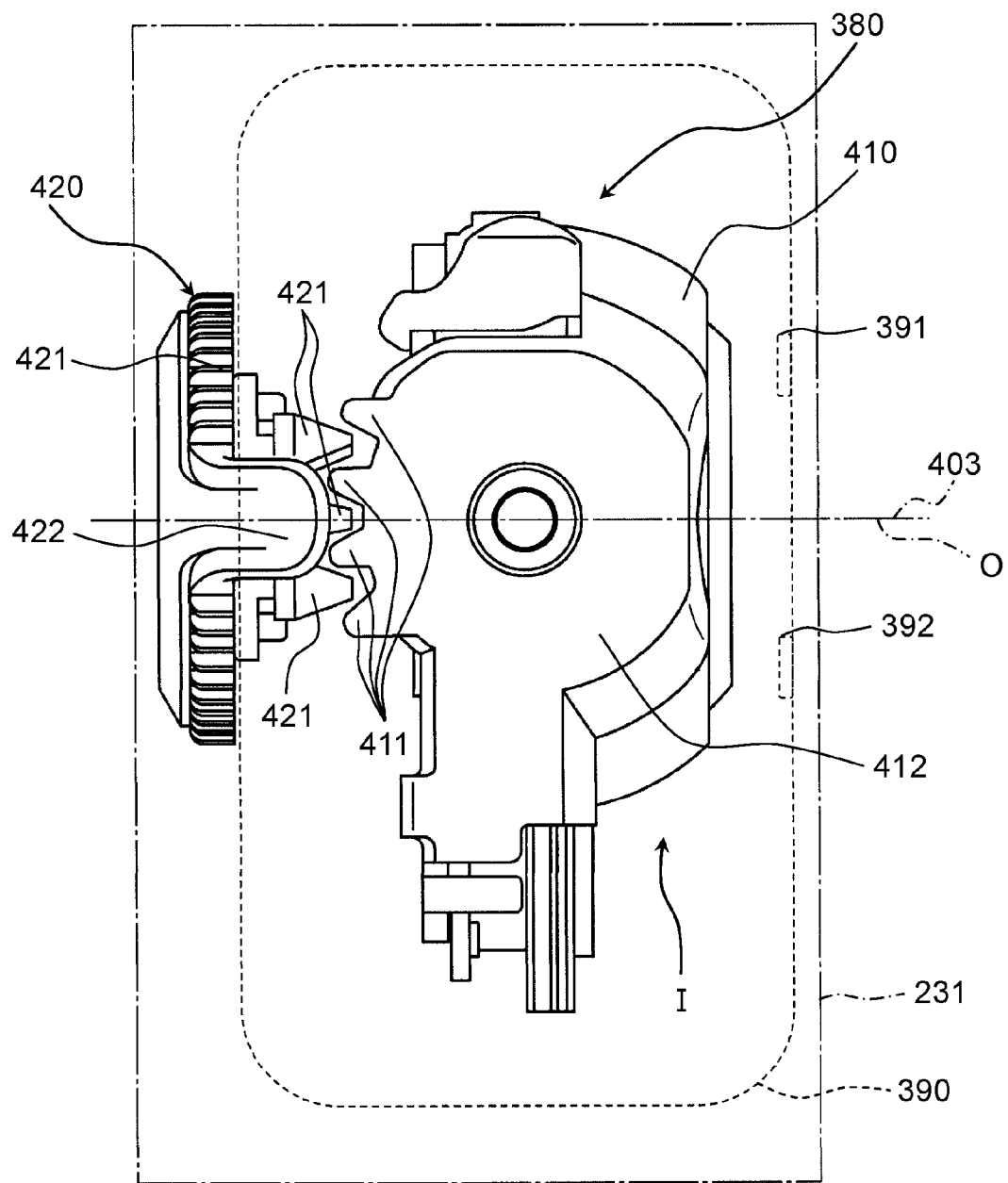
FIG. 11 is a side view of the camera unit of the sub-camera in an upright state.
Figure 12:
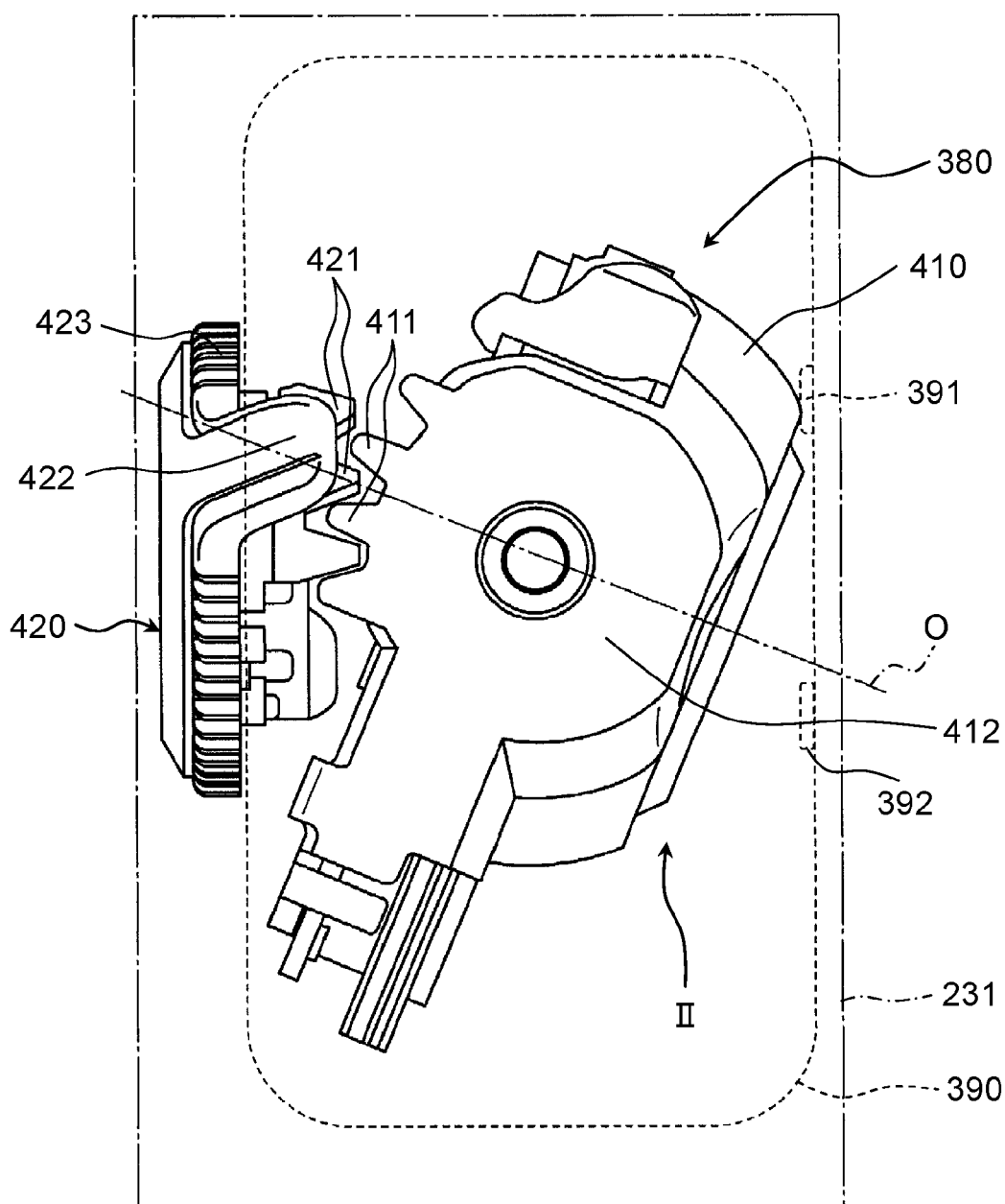
FIG. 12 is a side view of the camera unit of the sub-camera in a forward tilt state.
Figure 13:
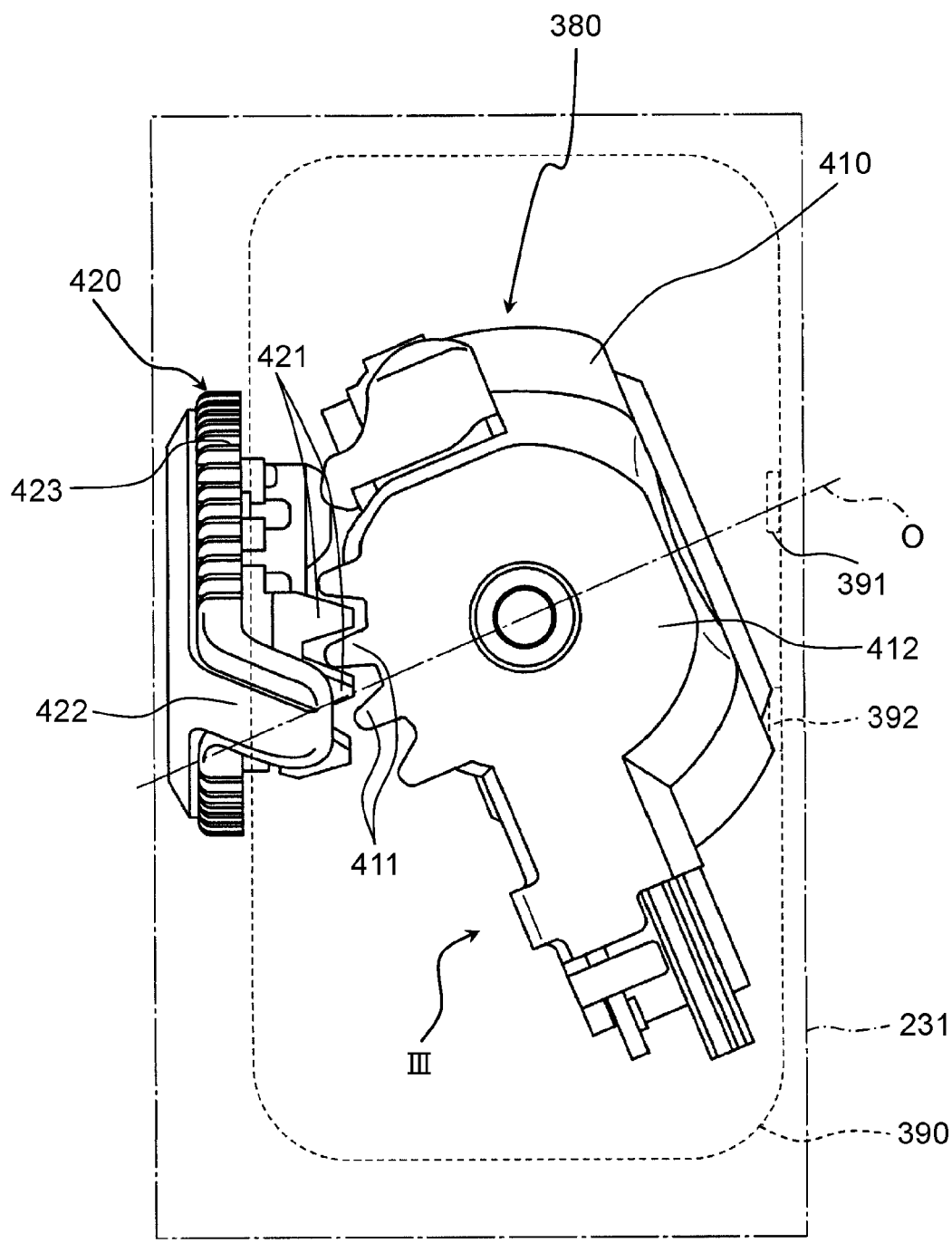
FIG. 13 is a side view of the camera unit of the sub-camera in a backward tilt state.

Next is described the operation of lens tilt mechanism 400 with reference to FIGS. 11 to 13. FIG. 11, FIG. 12, and FIG. 13 show the state of lens tilt mechanism 400 in the upright position, forward tilt position, and backward tilt position of lens holder 410, respectively.

Camera unit 380 is supported such that it is rotatable about second axis 402 in forward and backward directions relative to housing 390 so that camera unit 380 can be tilted in a predetermined angular range. The predetermined angular range is a range between the forward tilt position II (see FIG. 12) in which camera unit 380 is tilted forward relative to upright position I and backward tilt position III (see FIG. 13) in which camera unit 380 is tilted backward relative to upright position I (see FIG. 11) with reference to upright position I where optical axis O of lens 381 of camera unit 380 coincides with third axis 403.

Here, cylindrical space 231 is a cylindrical space formed as an operation locus of housing 390 rotating about first axis 401. Housing 390 includes forward tilt limiter (forward tilt stopper) 391 and backward tilt limiter (backward tilt stopper) 392 for restricting a position of forward tilting operation (forward tilt position II) in forward rotation and a position of backward tilting operation in backward rotation (backward tilt position III) of lens holder 410 so that lens holder 410 does not protrude outside cylindrical space 231 when camera unit 380 rotates about second axis 402. More specifically, as shown in FIG. 12, lens holder 410 touches forward tilt limiter 391 when camera unit 380 tilts forward, and thus camera unit 380 is restricted at forward tilt position II. In the same way, as shown in FIG. 13, lens holder 410 touches backward tilt limiter 392 when camera unit 380 tilts backward, and thus camera unit 380 is restricted at backward tilt position III.

The restriction of the tilting operation of camera unit 380 at forward tilt position II and backward tilt position III prevents protrusion of camera unit 380 outside cylindrical space 231, and ensures the smooth rotation of sub-camera 300 around first axis 401 inside cylindrical space 231. In addition, the rotation of operating member 420 may be restricted to limit a rotation angle, so as to restrict the position of tilting operation of camera unit 380. For example, operating knob 422 of operating member 420 may contact a restricting member provided on housing 390 for restricting the rotation of operating member 420. Or, a separate protrusion may be provided on operating member 420 to restrict its rotation.

Accordingly, by the use of lens tilt mechanism 400, camera unit 380 rotates about second axis 402 among forward tilt position II, upright position I, and backward tilt position III as the photographer rotates operating member 420 about third axis 403. As a result, camera unit 380 of sub-camera 300 can be rotated about second axis 402 in forward and backward directions regardless of an opening angle of openable unit 230. Still more, camera unit 380 can be tilted while being rotated about second axis 402 in forward and backward directions inside same cylindrical space 231, in addition to the rotation of entire sub-camera 300 about first axis 401 in forward and backward directions in cylindrical space 231 formed in one end of openable unit 230.

Accordingly, the exemplary embodiment offers small sub-camera 300 with good operability and digital video camera 100 including sub-camera 300 that is rotatable forward and backward in two directions independently: first axis 401 and second axis 402.

In other words, in camera unit 380 that is rotatable about first axis 401 in forward and backward directions in cylindrical space 231, lens tilt mechanism 400 in the exemplary embodiment enables camera unit 280 to rotate and tilt about second axis 402 in forward and backward directions via engagement of second gear 421 and first gear 411 by rotating operating member 420 about third axis 403 in forward and backward directions inside this cylindrical space. Accordingly, lens tilt mechanism 400 has a simple and compact structure, and sub-camera 300 can rotate forward and backward about first axis 401 and also rotate forward and backward about second axis 402 (the forward and backward tilting operation of camera unit 380 by lens tilt mechanism 400) at the same time inside cylindrical space 231 formed on one end of openable unit 230.

First gear 411 is always positioned on the side of operating member of lens holder 410 during the forward and backward rotation of lens holder 410 about second axis 402, and thus first gear 411 is not exposed on the surface, also achieving good appearance design.

5. Other Exemplary Embodiments

The above exemplary embodiment is described as an example of technology disclosed in the present disclosure. However, technology in the present disclosure is not limited in any way by the exemplary embodiment. Other exemplary embodiments including any change, replacement, addition, or omission to the exemplary embodiment are therefore intended to be embraced therein.

For example, the above exemplary embodiment has a structure that sub-camera 300 transits from the non-use state (mode 1) to the selfie state (mode 2), and then from the selfie state to the confronting shooting state (mode 3), and sub-camera 300 faces the photographer when switch lever 340 comes to the position facing rotating cam groove 373. However, sub-camera 300 may transit from the non-use state to the confronting shooting state, and then from the confronting shooting state to the selfie state, and sub-camera 300 may be set to the confronting shooting state when switch lever 340 comes to the position facing rotating cam groove 373. In other words, switch lever 340 may come to the position facing rotating cam groove 373 at the center position when sub-camera 300 transits to at least three modes.

Still more, the shape of rotating cam groove 373 is not limited to the shape in the above exemplary embodiment. For example, rotating cam groove 373 may be formed by an arc notch. Still more, the state may be switched when switch lever 340 faces slope 372.

Still more, the rotation limiter provided in sub-camera hinge unit 310 restricts the rotation of sub-camera 300 to within a 270-degree rotation range in the exemplary embodiment. However, the present disclosure is not limited to this range. More specifically, sub-camera 300 may be rotated beyond the 270-degree rotation range without providing the rotation limiter in sub-camera hinge unit 310.

Still more, sub-camera 300, which is an imaging unit, in the exemplary embodiment is rotatably fixed in cylindrical space 231 formed in one end of openable unit 230. However, sub-camera 300 may be detachably disposed relative to openable unit 230. In this case, sub-camera 300 may have wired connection with openable unit 230 or wireless connection with controller 260 of camera body 200 for sending image signals.

To give an exemplary embodiment of the disclosed technology, attached drawings and components described herein may include those not essential for solving the disadvantage, in addition to components essential for solving the disadvantage. It is therefore apparent that these non-essential components shall not be noted as essential just because they are included in attached drawings or description.

The exemplary embodiment described herein are therefore illustrative. All modifications including changes, replacements, additions, and omissions, which come within the meaning and range of equivalency of the claims are therefore intended to be embraced therein.

INDUSTRIAL APPLICABILITY

The present disclosure is applicable to rotatable cameras, digital video cameras equipped with the camera, and imaging devices, such as other wearable cameras and on-vehicle cameras.

What is claimed is:
1. An imaging apparatus comprising:
a main body,
a first camera fixedly arranged on the main body;
an opening-closing unit provided rotatably with respect to the main body via a first hinge unit;
a second camera mounted on the opposite side of the opening-closing unit from the first hinge unit; and
a second hinge unit for rotatably supporting the imaging direction of the second camera, wherein
a body surface of the second camera is uneven, and the rotation direction of the first hinge unit and the rotation direction of the second hinge unit are the same rotation direction at the time of starting shooting with the second camera.

* * * * *